May 18, 1926. 1,585,271
D. McD SUSI
DIRECTION INDICATOR FOR VEHICLES
Filed Oct. 9, 1925
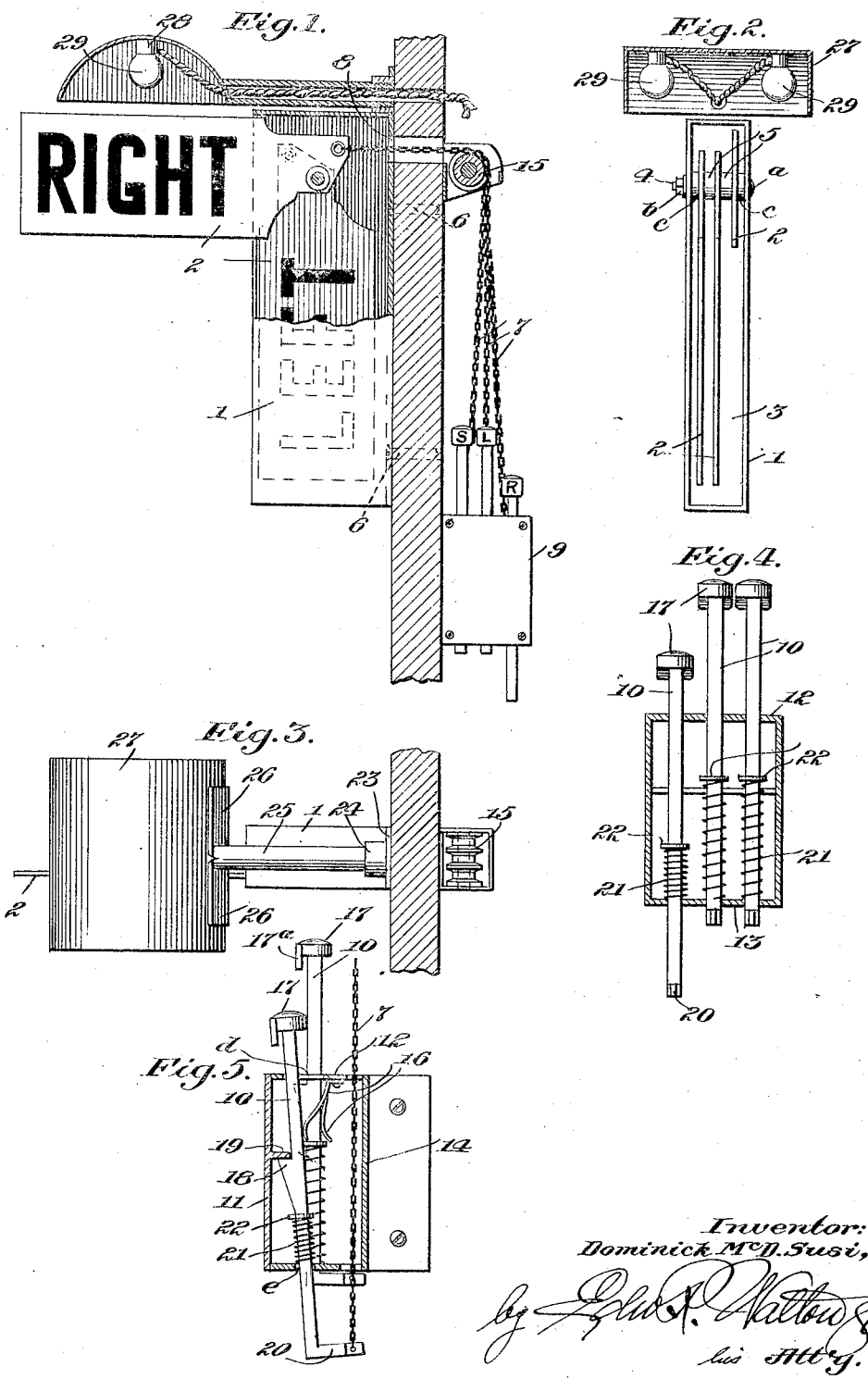

Patented May 18, 1926.

1,585,271

UNITED STATES PATENT OFFICE.

DOMINICK McDONNELL SUSI, OF PITTSFIELD, MAINE.

DIRECTION INDICATOR FOR VEHICLES.

Application filed October 9, 1925. Serial No. 61,487.

The present invention is a direction indicator for vehicles of the type employing movable signal members, for indicating the direction the vehicle is about to take, or to indicate whether it is to stop, and has for its object to produce a simple device of compact structure, and manually operated.

A further object of the invention is to provide such a signaling device which may be operated by keys from within the car, conveniently arranged within reach of the driver, the mere operation of which will cause the signal to be moved to signaling position and to return to ineffective position.

The invention resides in the sundry details of construction, combination and arrangement of parts which will be defined as the specification proceeds, and as pointed out in the appended claims.

In this specification and the annexed drawings, the invention is disclosed in the form in which it is considered to be the best, but the invention is not limited to such forms because it is capable of being embodied in other forms; and it is to be understood that in and by the claims following the description herein it is intended to cover the invention in whatever form it may be embodied within the scope thereof.

In the drawings which illustrate the preferred embodiment of the invention as at present devised:

Figure 1 is an elevation of the signaling device as viewed from the driver's seat or the rear of the car, with a portion broken away to illustrate the interior construction of the signal device;

Fig. 2 is an end elevation of the indicating device as shown in Fig. 1;

Fig. 3 is a top plan view of the invention as shown in Figs. 1 and 2;

Fig. 4 is a front view of the actuator, with the face plate removed, illustrating its interior construction; and Fig. 5 is a vertical sectional view of the actuator as shown in Fig. 4.

In the following description and annexed drawings, like characters denote similar and like parts throughout the various views.

The indicator of this invention may be applied to any desired portion of the automobile or other vehicle according to the needs, requirements or preference in each particular instance. It is preferred, however, for the purpose of the present illustration, to show the indicator as attached to the left end side of the car body at or adjacent the windshield, in order that the same may be viewed by the driver from his seat.

The indicator comprises a casing 1 of such size and dimensions as will conveniently house the signaling arms 2, and preferably takes the form of an elongated casing opened at one side, as at 3. The signaling arms 2 are supported in the casing 1 on a shaft 4 having its upper ends suitably mounted in the front and rear walls of the casing 1. In the present illustration the shaft takes the form of a bolt having a head $a$, and a threaded end to receive the nut $b$, which extend through openings in the front and rear walls of the casing, which openings are slotted on their inner faces with a boss $c$ suitably secured thereto. The shaft 4 extends through openings in the upper ends of the signal arms, there being suitably spaced members 5 between said arms which may be of metal, rubber, fibre or the like, or a combination thereof, in order to take up lost play between the arms and to prevent unnecessary rattling, which can be further eliminated by tightening of the nut $b$. These signal arms, of which there are three in number, and which may be of any suitable number for the purposes desired, normally lie in parallel alignment within the casing 1, and out of view; and the arms may be of any suitable material such as metal, translucent material or the like, each bearing a suitable indication to give the proper signal desired to the traffic or pedestrians, as to the direction of travel the vehicle is about to assume.

The casing 1 may be attached to the vehicle in any suitable manner, and in the present instance openings 6 are shown in the side wall of the casing (opposite the opening 3), to permit said attachment by bolts, screws or the like. When the device is used in connection with open or so-called "touring" types of vehicles, a suitable clamp may be secured through these openings, or in any other suitable manner, to the casing 1, in order that it may be clamped to the supporting frame of the windshield.

The signaling arms 2 are each independently raised from their normal depending position within the casing 1 to a horizontal position by suitable flexible members 7, such as cables, chains, wires or the like, attached to an upwardly extending projection on each arm adjacent its pivoted end, and is extended through a suitable opening 8 in the casing, to a sheave or pulley 15 mounted, preferably, within the vehicle, and thence extend downwardly to the actuator 9, each of said flexible members being suitably connected, respectively, to one of said depressible members 10 of the actuator.

The actuator 9 consists of a casing preferably having a removable front plate 11, top and bottom walls 12 and 13, and an inner wall 14. The walls 12 and 13 have a plurality of slidable rods 10 extending through corresponding angular openings $d$ and $e$ therein to prevent rotation of the rod therein, but, however, the openings $d$ are elongated as shown in the drawings to permit of a lateral shifting movement of the rod 10 therein. A spring 16, here shown as a flat leaf spring, has one end secured to the casing and its other end bearing against the rear side of each rod 10, so as to urge the upper end of the rod against the forward end of the slot $d$, as clearly shown in the drawing. The upper end of each rod is provided with a finger key 17 in order that the same may be readily depressed by the finger of the operator, and when depressed, the detent 18 provided on the front face of each plunger will engage the keeper bar 19, preferably provided on the inner face of the cover plate 11, and arranged in the path of movement of the detent 18. As the plunger 10 is being depressed and passing the keeper 19, the same is shifted laterally against the spring 16, and when past the same will be urged into locking engagement therewith by said spring 16. The lower end of the plunger 10 is preferably offset or bent, as at 20, to which the cables 7 are attached. It will thereby be seen upon depressing each key 17, that one of the cables 7 is pulled, which will cause the respective signal arms 2 to be raised to indicating position and held in this position until released. Each of the keys 17 carries indicia indicating the signal which it operates. To release the indicating arm from its horizontal indicating position it is only necessary that the operator press the face 17ª of the respective key in order to shift the plunger rearwardly in the slot opening $d$ in order to disengage the detent 18 from keeper 19. The weight of the signal arm ordinarily is sufficient to return the signal to its normal depending position and to return the operating key 17 back to its normal position when the detent 18 is released. However, it may be further desirable to use a coil spring 21 surrounding the lower portion of each plunger 10 and bearing upon the bottom wall 13 and against a collar 22 on each of said plungers.

In order that the signals may be illuminated at night a light is arranged to extend over the signal arms in their extended position. In the present invention this illuminating means is permanently attached to the upper end of the casing 1 by means of a projection 23 on the upper inner corner thereof, which carries a threaded boss 24 into which the threaded end of a tubular bracket 25 is secured. The outer end of the bracket 25 is split and the split portion extended in offset directions to provide the arms 26, which are suitably secured, such as by welding, bolts, or the like, to a reflector 27. The upper inner wall of the reflector has suitably secured thereto, such as by solder or by any other suitable means, two electric light sockets 28 designed to receive the electric lamps 29. The bracket arm 25 is preferably tubular in order to form a conduit for the electric conductors to the sockets 28, and is of such length as to extend slightly beyond the outer side of the casing, which is positioned to overlie the signal arms when they are in their horizontal signaling position, to reflect the light upon the same in order that they may be clearly visible at night or at such times as desired.

From the foregoing it will be seen that a direction indicator of a very simple but effective and durable construction is provided, and which can be operated from the dashboard by merely depressing the suitable key for operating the desired signal. Also, that the present construction provides means for entirely housing the signal arms at their pivoted ends so as to protect them from sleet and ice, and that the same are pivotally mounted in such a manner that they may be readily adjusted to eliminate rattles and to take up any play or wear that is occasioned between them without employing some expensive construction. Also the signal may be provided with or without the light bracket 25.

What I claim is:

1. An actuator for a normally depending movable element comprising a depressible member having a stem; a guide having said stem slidably mounted therein for longitudinal reciprocation and lateral shifting movement; yielding means normally urging and maintaining said stem in one of its lateral shifted positions; a detent on the stem; a keeper arranged in the path of the detent and with which the latter will latch; said stem and operative connection between said movable element, whereby the latter may be moved to a substantially horizontal position and maintained out of normal position, when the stem is depressed to latched position, and whereby the member may be released and returned to normal position by the returning movement of said removable element, when the stem is laterally shifted against the tension of said yielding means.

2. An actuator for actuating movable members comprising a casing, a depressible plunger slidably extending through an elongated guide opening in one wall of said casing, other means in the casing for guiding said plunger therein; a spring in the casing for maintaining said plunger in one position in said elongated opening; a detent on said plunger and within said casing; a keeper in said casing and arranged in the path of said detent while being depressed and with which the detent will latch; an arm on the plunger extending exteriorly of the casing, a flexible operative connection between said arm and the movable member the portion of said flexible connection connected with said arm extending upwardly whereby the latter may be moved and maintained in position, when said plunger is depressed to latching position, and whereby the member will be released, when said plunger is laterally shifted against the tension of said spring; and a spring for said plunger for returning the same to normal position when said detent is released.

In testimony whereof I have hereunto set my hand.

DOMINICK McDONNELL SUSI.